J. S. BALL.

Improvement in Hubs for Wheels of Vehicles.

No. 128,354. Patented June 25, 1872.

WITNESSES;

INVENTOR.
John S. Ball 128,354

UNITED STATES PATENT OFFICE.

JOHN S. BALL, OF CHARLESTON, ILLINOIS.

IMPROVEMENT IN HUBS FOR WHEELS OF VEHICLES.

Specification forming part of Letters Patent No. 128,354, dated June 25, 1872.

Specification describing certain Improvements in Vehicle-Hubs and Setting Boxes, by JOHN S. BALL, of Charleston, in the county of Coles and State of Illinois.

The object of my invention is to provide hubs for vehicles of cast-iron, with any kind of boxes, the box to be cemented in the hub in such a manner that it can be removed and a new one substituted in case the old box should wear and become useless.

Figure 1:
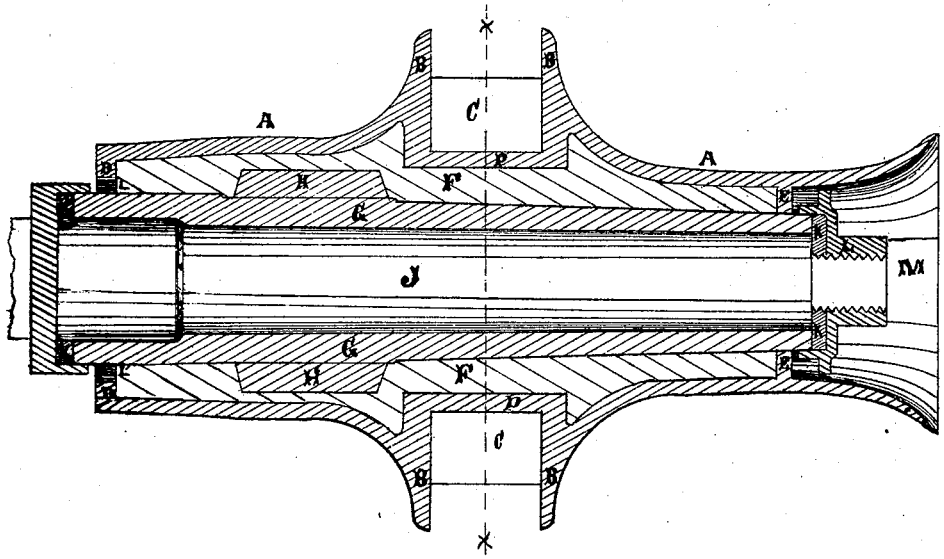
Figure 2:
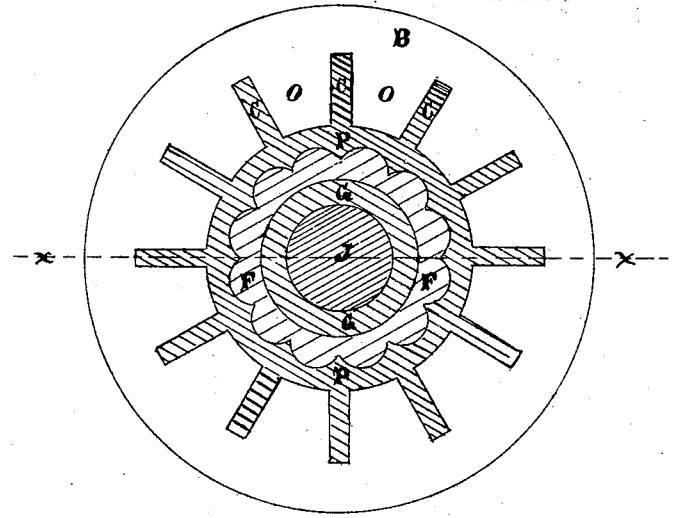

Figure 1 represents a vertical transverse section of the hub and box embodying my improvement. Fig. 2 represents a cross-section through the line $x\ x$.

A represents the hub, cast hollow to receive the box G. B B are the flanges that form the side supports for the spokes. C C are the partitions between the mortise in the cast-iron hub that receives the ends of the spokes. D represents a flange cast in the end of the hub A, and the hole in the flange is large enough to let the box G enter the hub and be trued up. E is a flange on the front end of the hub, and has to be reamed out, so that the end of the box G can be made a tight fit. F is the cement that secures the box inside of the hub A. G is the box in which the axle works. H H are lugs on the box G. J is the axle. K K are leather washers. L is the nut on the end of the axle. M is the rim of the hub that forms a casing for the nut. O O are the mortises to receive the spokes. P P represent a portion of the inside of the hub A, that is corrugated so that the cement cannot turn around.

The operation of my improvement is as follows: After the hub A is well cleaned out on the inside the hole in the flange E E at the front end of the hub is reamed out and the box G is inserted and driven in tight. The rear end of the box is then keyed up and the wheel made true, after which cement of any kind that is suitable is panned into the hub at the rear end and through the hole L' in the flange D D, and the box is secured in its proper position. If the box should become damaged or worn so that a new one is required, the old box is driven out and a new box substituted in its place.

Claim.

I claim—

The combination of a metal box and metallic hub when constructed and operated according to the specific devices named, substantially as or for the purpose hereinbefore set forth.

In testimony whereof I have signed my name to this specification in the presence of two subscribing witnesses.

JOHN S. BALL.

Witnesses:
S. C. FRINK,
E. C. FRINK.